(12) United States Patent
Mairing

(10) Patent No.: US 7,270,367 B2
(45) Date of Patent: Sep. 18, 2007

(54) FRONT HOOD SYSTEM

(75) Inventor: Wolfgang Mairing, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 20 days.

(21) Appl. No.: 10/563,331

(22) PCT Filed: Jul. 1, 2004

(86) PCT No.: PCT/EP2004/007164

§ 371 (c)(1),
(2), (4) Date: Apr. 12, 2006

(87) PCT Pub. No.: WO2005/002933

PCT Pub. Date: Jan. 13, 2005

(65) Prior Publication Data

US 2006/0226679 A1  Oct. 12, 2006

(30) Foreign Application Priority Data

Jul. 3, 2003 (DE) ............................... 103 29 906

(51) Int. Cl.
B32B 1/00 (2006.01)

(52) U.S. Cl. ........................... 296/193.11; 296/187.09; 280/69.21

(58) Field of Classification Search ........... 296/187.04, 296/187.09, 193.11, 76; 280/69.21, 69.22, 280/69.2

See application file for complete search history.

(56) References Cited

U.S. PATENT DOCUMENTS 5,273,341 A * 12/1993 Cornille, Jr. ............ 296/193.11
7,114,765 B2 * 10/2006 Ishikawa et al. ....... 296/193.11

FOREIGN PATENT DOCUMENTS

| DE | 29 22 893 A | 12/1980 |
| DE | 198 51 472 A1 | 5/2000 |
| DE | 100 38 812 A1 | 2/2002 |
| DE | 101 23 479 A | 11/2002 |
| EP | 1 004 497 A1 | 5/2000 |
| GB | 2 343 419 A | 5/2000 |
| JP | 2001-199367 A | 7/2001 |

* cited by examiner

Primary Examiner—Joseph D Pape
(74) Attorney, Agent, or Firm—Crowell & Moring LLP

(57) ABSTRACT

The invention relates to a front bonnet system of a motor vehicle with a front bonnet (1) and with encircling body parts (2, 3). The body parts (2, 3) have supporting points (4) which are flexible in the vertical direction and on which the front bonnet (1) is supported when closed. The flexible supporting points (4) are designed as a linearly encircling supporting strip (5) with a sealing strip (6) situated between the supporting strip (5) and the front bonnet (1). The front bonnet (1) has, on its side (7) facing the supporting strip (5), an absorption strip (8) which encircles it in a manner corresponding to the supporting strip (5) and can be brought to bear against the sealing strip (6).

20 Claims, 2 Drawing Sheets

FRONT HOOD SYSTEM

BACKGROUND AND SUMMARY OF THE INVENTION

The invention relates to a front hood system of a motor vehicle.

When motor vehicles collide with pedestrians, the front portion of the motor vehicle forms an impact surface which has to be provided with a defined flexibility in order to avoid or at least to reduce injuries to individuals. The central region of the front hood, which is of planar design, may be designed such that it is correspondingly elastically or plastically deformable.

In the driving mode, in which the front hood is closed, the latter rests on corresponding supporting points of the surrounding body parts, such as the wing, front subassembly or the like. In the region of the supporting points mentioned, there is only slight vertical flexibility. For example, in the event of a vertical head impact in this region, the lack of flexibility may give rise to undesirably high impact accelerations. In addition, in the case of vehicles with a front engine, increasingly stringent demands regarding the absorption of noise require effective countermeasures in the region of the front hood. In addition to a planar lining of the engine hood with a suitable sound-absorbing mat, a means of absorbing noise may also be required in the region of the encircling front hood edge.

Front hood systems are known, in which the body-side supporting points for the front hood are designed flexibly in the vertical direction to reduce the consequences of an impact. For adequate flexibility, a corresponding construction height is required which is not always provided in the constricted parts of a front portion of a motor vehicle. Measures for absorbing noise and for sealing the front hood in the region of its edge may adversely affect the desired flexibility in this region.

The invention is based on the object of developing a front hood system in such a manner that the front hood, in the region of its edge, has improved impact flexibility without having an adverse effect on the sealing of the edge.

For this purpose, in order to form the flexible, body-side supporting points, a linearly encircling supporting strip with a sealing strip situated between the supporting strip and the front hood is provided. In this case, the front hood has, on its side facing the supporting strip, an absorption strip which encircles it in a manner corresponding to the body-side supporting strip and can be brought to bear against the sealing strip. When the front hood is closed, the absorption strip, the sealing strip and the supporting strip are pressed onto one another, with the closing forces or counterforces occurring leading in conjunction with the associated, elastic deformation to a reliable, encircling sealing-off of the engine hood from the body parts situated around it. At the same time, the absorption strip and supporting strip, which is flexible in the vertical direction, form a joint potential for deformation with an overall high deformation distance. If the abovementioned parts are appropriately mechanically configured, a large amount of impact energy can be absorbed over an overall large deformation distance, as a result of which impact accelerations which occur are kept to a correspondingly low level. In customary operation, the encircling sealing strip on the flexible supporting strip provides reliable sealing and contributes to the absorption of noise without restricting the deformation distance, which can be achieved structurally, of the absorption strip and supporting strip.

In one embodiment, the front hood has, at least over a partial region of its outer edge, an outer region reaching from the absorption strip as far as the outer edge, a clearance extending over the width of the outer region in the vertical direction as far as the supporting strip situated below. This design avoids, in the event of a vertical impact, the designated deformation distance being limited by the hood outer edge striking against a body part situated below it. An overall deformation distance is available which is composed of the individual deformation distances of the absorption strip and of the flexible supporting strip.

In another embodiment, the supporting strip has a doubly bent, approximately Z-shaped cross section with a free limb for receiving the sealing strip and a retaining limb secured on the adjacent body part. In this case, the free limb lies in the vertical direction below the retaining limb. The effect achieved by this arrangement is that, in the closed state of the hood, the cross section of the absorption strip lies approximately laterally next to the central part of the Z-shaped cross section of the supporting strip. An overall small construction height of the flexible system comprising the absorption strip, the sealing strip and the supporting strip is produced.

In this case, the supporting strip is advantageously manufactured from plastic. Given a suitable structural design, an elastoplastic behavior of the supporting strip in terms of flexibility that reduces the impact accelerations can readily be obtained.

To improve the sound-absorbing effect, the absorption strip is advantageously coated with a sound-absorbing material on its side facing the sealing strip. For this purpose, the sound-absorbing material is in particular formed by a sound-absorbing mat which is fitted on the inside of the front hood and is drawn around the absorption strip. In the closed state of the hood, the sound-absorbing material bears, in a planar manner, against the sealing strip. The overall elastically flexible supporting system of the front hood leads to a uniform, planar bearing with correspondingly good sound-absorbing effect without the desired elastoplastic behavior in terms of flexibility in the event of an impact being impaired.

To produce a defined contact pressure with good plastic energy absorption behavior, the absorption strip expediently has an approximately trapezoidal cross section, the narrow side of which can be brought to bear against the sealing strip.

The absorption strip is advantageously formed from a rigid synthetic foam. In the event of an impact load, the foam bubbles of the rigid foam collapse in the manner of a cascade, as a consequence of which a high energy absorption with comparatively low force peaks is provided over the entire deformation distance. In an advantageous alternative, the absorption strip is formed from a plastic hollow trough. The plastic hollow trough can be produced with little outlay in terms of manufacturing and is easy to fit. From the onset of a certain limit force, the cross section collapses and results in a desired energy-absorbing flexibility. Below the limit load, the hollow cross section of the plastic hollow trough has an elastic flexibility. Height tolerances in the encircling sealing system can be correspondingly readily compensated for. Smaller additional loads can readily be absorbed without the absorption strip being damaged.

BRIEF DESCRIPTION OF THE DRAWINGS

Exemplary embodiments of the invention are described in more detail below with reference to the drawing, in which.

DETAILED DESCRIPTION

Figure 1:
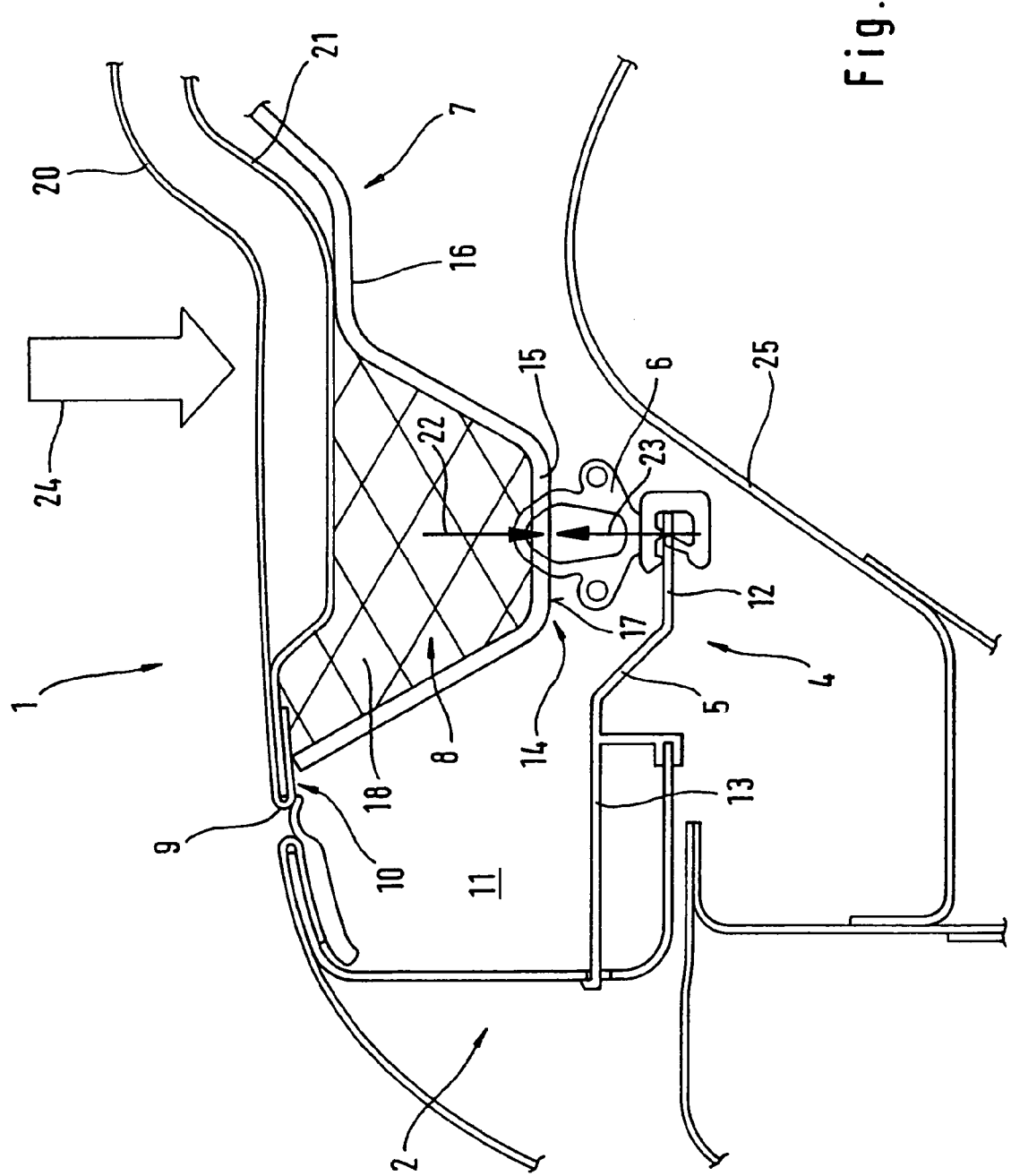
FIG. 1 is a diagrammatic cross-sectional illustration showing a detail from the front region of a motor vehicle with a rigid foam absorption strip and a supporting strip which is Z-shaped in cross section.

FIG. 1 shows a detail of a diagrammatic illustration of a section transversely with respect to the direction of travel through the front region of a motor vehicle. The front region has a front hood 1 and body parts 2 and 3 (FIG. 2) encircling around the front hood 1. The body part 2 shown by way of example in FIG. 1 is a front wing with a wheel house 25. A supporting strip 5 which runs at least partially linearly around the opening closed by the front hood 1 and which forms a supporting point 4, which is flexible in the vertical direction, for the front hood 1, is secured on the body part 2.

In the exemplary embodiment shown, the supporting strip 5 is manufactured from plastic and has a doubly bent, approximately Z-shaped cross section with a free limb 12 for receiving a sealing strip 6 and with a retaining limb 13 secured on the adjacent body part 2. The free limb lies in the vertical direction below the retaining limb 13.

The front hood 1 comprises an outer shell 20 and an inner shell 21, with, on the front hood 1, on its side 7 facing the supporting strip 5, an absorption strip 8 which encircles it in a manner corresponding to the supporting strip 5 and can be brought to bear against the sealing strip 6 being provided. The absorption strip 8 is coated on its side 14 facing the sealing strip 6 with a sound-absorbing material 15 which, in the exemplary embodiment shown, is formed by a sound-absorbing mat 16 which is fitted on the inside of the front hood 1 and is drawn around the absorption strip 8. The absorption strip 8 has an approximately trapezoidal cross section with a narrow side 17 and, in the exemplary embodiment shown, is formed from a rigid synthetic foam 18.

In the closed state of the front hood 1 that is shown, the latter bears with the narrow side 17 of the absorption strip 8 against the sealing strip 6. The cross section of the sealing strip 6 is shown undeformed, the absorption strip 8, the sound-absorbing material 15, the sealing strip 6 and the supporting strip 5 being elastically deformed under the action of a closing force, illustrated by an arrow 22, and a counterforce, indicated by a corresponding arrow 23, in such a manner that the narrow side 17 of the absorption strip 8 bears against the sealing strip 6 in a reliably sealing manner.

Under the action of a vertical impact force 24 in the region of an outer edge 9 of the front hood 1, the absorption strip 8, the sound-absorbing material 15, the sealing strip 6 and the supporting strip 5 yield in the direction of the impact force 24. In this case, a plastic deformation occurs in particular in the region of the absorption strip 8 and the supporting strip 5 in order to absorb the impact energy. Given an appropriate configuration of the rigid synthetic foam 18, the latter can collapse over virtually the entire cross-sectional height of the absorption strip 8 with a corresponding, plastic distance in terms of flexibility. In addition, the supporting strip 5 deflects downward in the vertical direction, with an elastoplastic cross-sectional deformation occurring. In the case of correspondingly high deformation distances, the cross section of the supporting strip 5 may even be entirely knocked through downward. The energy absorption distances of the absorption strip 8 and of the supporting strip 5 are added up in the process.

In the partial region shown in FIG. 1, the front hood 1 has an outer region 10 reaching from the absorption strip 8 as far as the outer edge 9, with a clearance 11 extending over more than the entire width of the outer region 10 in the vertical direction as far as the supporting strip 5 situated below. Given appropriate deformation of the absorption strip 8 and the supporting strip 5, the front hood 1 can yield in the vertical direction without obstruction at least until the outer edge 9 comes to bear against the retaining limb 13 of the supporting strip 5.

Figure 2:
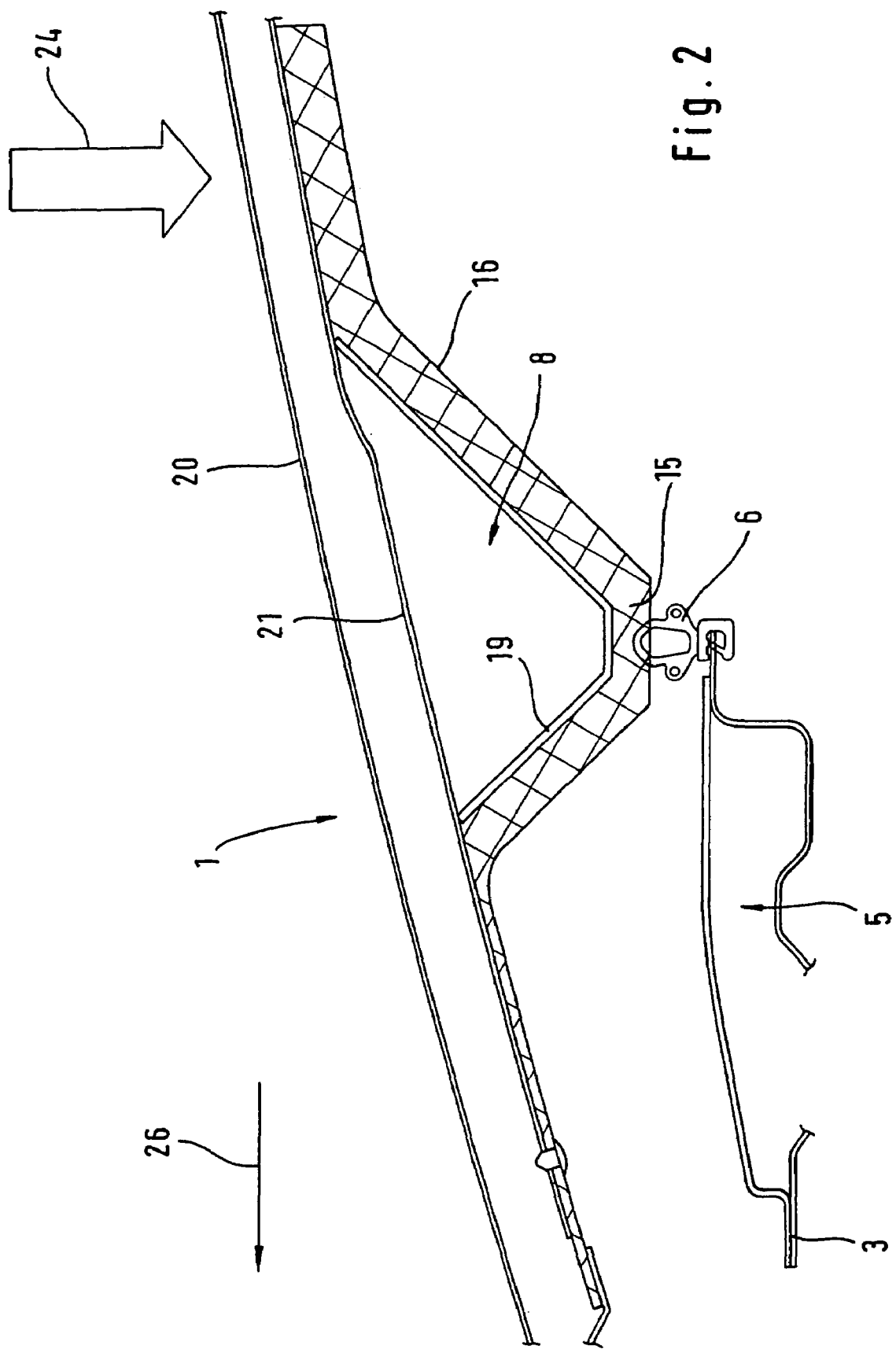
FIG. 2 is a diagrammatic illustration of a longitudinal section, illustrating a variant of the arrangement according to FIG. 1 with an absorption strip designed as a plastic hollow trough.

FIG. 2 shows, in an illustration of a detail, a variant of the arrangement according to FIG. 1, a longitudinal section corresponding to the direction of travel indicated by the arrow 26 being selected for illustration. The front hood 1 rests with its absorption strip 8 on the sealing strip 6 of the supporting strip 5. The supporting strip 5 is secured on a body part 3 in the form of a front subassembly (indicated). In the exemplary embodiment shown, the absorption strip 8 is formed from a plastic hollow trough 19 with an approximately trapezoidal cross section. In the remaining features and reference numbers, the arrangement according to FIG. 2 corresponds to the arrangement according to FIG. 1.

The invention claimed is:

1. A front hood system of a motor vehicle, comprising:
   a front hood;
   at least one encircling body part having at least one supporting point flexible in the vertical direction and on which the front hood is supported when closed said at least one supporting point including a linearly encircling supporting strip with a sealing strip situated between the supporting strip and the front hood, the front hood having, on its side facing the supporting strip, an absorption strip which encircles the front hood in a manner corresponding to the supporting strip and is designed to be brought to bear against the sealing strip.

2. The front hood system as claimed in claim 1, wherein the front hood has, at least over a partial region of an outer edge, an outer region extending from the absorption strip to the outer edge, a clearance extending over the width of the outer region in the vertical direction to the supporting strip situated below.

3. The front hood system as claimed in claim 1, wherein the supporting strip has a doubly bent, approximately Z-shaped cross section, with a free limb for receiving the sealing strip and a retaining limb secured on an adjacent one of said at least one body part, the free limb lying in the vertical direction below the retaining limb.

4. The front hood system as claimed in claim 1, wherein the supporting strip is plastic.

5. The front hood system as claimed in claim 1, wherein the absorption strip is coated with a sound-absorbing material on a side facing the sealing strip.

6. The front hood system as claimed in claim 5, wherein the sound-absorbing material is formed by a sound-absorbing mat fitted on the inside of the front bonnet and drawn around the absorption strip.

7. The front hood system as claimed in claim 1, wherein the absorption strip has an approximately trapezoidal cross section, a narrow side of which is able to be brought to bear against the sealing strip.

8. The front hood system as claimed in claim 1, wherein the absorption strip is formed from a rigid synthetic foam.

9. The front bonnet system as claimed in claim 1, wherein the absorption strip is formed from a plastic hollow trough.

10. The front hood system as claimed in claim 2, wherein the supporting strip is plastic.

11. The front hood system as claimed in claim 3, wherein the supporting strip is plastic.

12. The front hood system as claimed in claim 2, wherein the absorption strip is coated with a sound-absorbing material on a side facing the sealing strip.

13. The front hood system as claimed in claim 3, wherein the absorption strip is coated with a sound-absorbing material on a side facing the sealing strip.

14. The front hood system as claimed in claim 4, wherein the absorption strip is coated with a sound-absorbing material on a side facing the sealing strip.

15. The front hood system as claimed in claim 2, wherein the absorption strip has an approximately trapezoidal cross section, a narrow side of which is able to be brought to bear against the sealing strip.

16. The front hood system as claimed in claim 3, wherein the absorption strip has an approximately trapezoidal cross section, a narrow side of which is able to be brought to bear against the sealing strip.

17. The front hood system as claimed in claim 4, wherein the absorption strip has an approximately trapezoidal cross section, a narrow side of which is able to be brought to bear against the sealing strip.

18. The front hood system as claimed in claim 2, wherein the absorption strip is formed from a rigid synthetic foam.

19. The front hood system as claimed in claim 3, wherein the absorption strip is formed from a rigid synthetic foam.

20. The front bonnet system as claimed in claim 2, wherein the absorption strip is formed from a plastic hollow trough.

* * * * *